(12) United States Patent
Grey et al.

(10) Patent No.: US 10,229,222 B2
(45) Date of Patent: Mar. 12, 2019

(54) DYNAMICALLY OPTIMIZED CONTENT DISPLAY

(71) Applicants: Larry Grey, San Ramon, CA (US); Chris Heller, San Ramon, CA (US)

(72) Inventors: Larry Grey, San Ramon, CA (US); Chris Heller, San Ramon, CA (US)

(73) Assignee: GreyHeller, LLC, San Ramon, CA (US)

( * ) Notice: Subject to any disclaimer, the term of this patent is extended or adjusted under 35 U.S.C. 154(b) by 0 days.

(21) Appl. No.: 14/195,659

(22) Filed: Mar. 3, 2014

(65) Prior Publication Data

US 2015/0128124 A1    May 7, 2015
US 2016/0364219 A9    Dec. 15, 2016

Related U.S. Application Data

(63) Continuation-in-part of application No. 13/430,566, filed on Mar. 26, 2012, now abandoned.

(Continued)

(51) Int. Cl.
    *G06F 17/30*        (2006.01)
    *G06F 9/451*        (2018.01)
(Continued)

(52) U.S. Cl.
    CPC ......... *G06F 17/30905* (2013.01); *G06F 8/38* (2013.01); *G06F 9/4443* (2013.01);
(Continued)

(58) Field of Classification Search
    CPC ............. G06F 9/4443; G06F 17/30867; G06F 17/3089; G06F 17/30893; G06F 17/30899; G06F 17/30905
(Continued)

(56) References Cited

U.S. PATENT DOCUMENTS 6,341,316 B1    1/2002    Kloba et al.
6,510,468 B1 *   1/2003    Hayne ............... G06F 17/30893
                                                       707/E17.117
(Continued)

FOREIGN PATENT DOCUMENTS

EP           1398692 A2    3/2004
EP           2831697       2/2015
(Continued)

OTHER PUBLICATIONS

Lakshman, T. K., et al., Enhancing enterprise field productivity via cross platform mobile cloud apps, Proceedings of the second international workshop on Mobile cloud computing and services, 2011, pp. 27-32, [retrieved on Dec. 6, 2018], Retrieved from the Internet: <URL:http://dl.acm.org/>.*

(Continued)

*Primary Examiner* — Geoffrey R St Leger
(74) *Attorney, Agent, or Firm* — Carr & Ferrell LLP

(57) ABSTRACT

Provided are systems and methods for dynamic optimization of content on a client device. In one example, a method for dynamic optimization of content is based on receiving the content and parameters of a display area associated with the content from an enterprise system. The enterprise system is pre-configured based on predetermined business rules. The content is analyzed to determine properties associated with the content and selectively optimized based on the parameters of the display area and the properties associated with the content. Thereby, optimized content is produced. The optimized content is selectively rendered on the client device, thereby providing for selective optimization and rendering of the content without reconfiguring the enterprise system.

19 Claims, 7 Drawing Sheets

Related U.S. Application Data

(60) Provisional application No. 61/901,331, filed on Nov. 7, 2013.

(51) Int. Cl.
  *G06F 8/38* (2018.01)
  *G06F 21/31* (2013.01)
  *G06F 21/44* (2013.01)
  *G06F 21/62* (2013.01)
  *G06Q 10/06* (2012.01)
  *G06F 9/44* (2018.01)

(52) U.S. Cl.
  CPC .......... *G06F 9/451* (2018.02); *G06F 17/3089* (2013.01); *G06F 17/30867* (2013.01); *G06F 17/30893* (2013.01); *G06Q 10/06* (2013.01); *G06F 21/31* (2013.01); *G06F 21/44* (2013.01); *G06F 21/629* (2013.01)

(58) Field of Classification Search
  USPC ......... 717/E17.107, 109, 119, 121; 715/200, 715/234, 238, 242, 243, 744–747, 864
  See application file for complete search history.

(56) References Cited

U.S. PATENT DOCUMENTS

| | | | |
|---|---|---|---|
| 6,721,713 B1 | 4/2004 | Guheen et al. | |
| 6,807,569 B1 | 10/2004 | Bhimani et al. | |
| 7,197,041 B1* | 3/2007 | Tyebji | H04W 88/16 |
| | | | 370/310.2 |
| 7,318,066 B2* | 1/2008 | Kaufman | G06F 17/30572 |
| 7,366,900 B2 | 4/2008 | Shambroom | |
| 7,613,810 B2 | 11/2009 | Romero et al. | |
| 7,831,904 B2* | 11/2010 | Kim | G06F 17/2247 |
| | | | 715/234 |
| 8,032,567 B2* | 10/2011 | Schemer | G06Q 10/06 |
| | | | 707/811 |
| 8,196,062 B2* | 6/2012 | Sylthe | G06T 3/4092 |
| | | | 715/798 |
| 8,627,226 B2* | 1/2014 | Bates | G06F 3/0485 |
| | | | 715/248 |
| 8,706,802 B1 | 4/2014 | Dayan et al. | |
| 8,862,777 B2 | 10/2014 | Panidepu et al. | |
| 9,015,578 B2* | 4/2015 | Cooper | G06F 17/30905 |
| | | | 715/243 |
| 9,152,802 B2* | 10/2015 | Saraf | G06F 21/604 |
| 9,245,291 B1* | 1/2016 | Ballaro | G06Q 30/0635 |
| 9,336,320 B2* | 5/2016 | Larson | G06F 17/3089 |
| 2002/0049858 A1 | 4/2002 | Frietas et al. | |
| 2002/0073235 A1 | 6/2002 | Chen et al. | |
| 2002/0083411 A1 | 6/2002 | Bouthors et al. | |
| 2002/0103881 A1 | 8/2002 | Granade et al. | |
| 2003/0058277 A1 | 3/2003 | Bowman-Amuah | |
| 2004/0073565 A1* | 4/2004 | Kaufman | G06F 17/30572 |
| 2004/0133848 A1 | 7/2004 | Hunt et al. | |
| 2005/0114435 A1* | 5/2005 | DiPlacido | H04L 69/329 |
| | | | 709/202 |
| 2005/0183021 A1 | 8/2005 | Allen et al. | |
| 2006/0031870 A1* | 2/2006 | Jarman | G11B 27/105 |
| | | | 725/25 |
| 2006/0253894 A1 | 11/2006 | Bookman et al. | |
| 2007/0043837 A1* | 2/2007 | Kruse | G06F 17/30905 |
| | | | 709/220 |
| 2007/0053367 A1* | 3/2007 | Tyebji | H04W 88/16 |
| | | | 370/401 |
| 2007/0061707 A1* | 3/2007 | Sally | G06F 17/3089 |
| | | | 715/210 |
| 2007/0067338 A1* | 3/2007 | Koizumi | G06Q 10/10 |
| 2007/0100834 A1 | 5/2007 | Landry et al. | |
| 2007/0174291 A1 | 7/2007 | Cooper et al. | |
| 2008/0195934 A1* | 8/2008 | Kim | G06F 17/2247 |
| | | | 715/235 |
| 2009/0064105 A1 | 3/2009 | Lo et al. | |
| 2009/0083643 A1 | 3/2009 | Beringer | |
| 2009/0183244 A1* | 7/2009 | Saraf | G06F 21/604 |
| | | | 726/6 |
| 2009/0249290 A1 | 10/2009 | Jenkins et al. | |
| 2010/0083163 A1* | 4/2010 | Maghoul | G06F 1/1626 |
| | | | 715/781 |
| 2010/0262678 A1 | 10/2010 | Morgan et al. | |
| 2010/0313009 A1 | 12/2010 | Combet et al. | |
| 2011/0041048 A1* | 2/2011 | Schemer | G06Q 10/06 |
| | | | 715/212 |
| 2011/0072359 A1* | 3/2011 | So | G06F 9/452 |
| | | | 715/744 |
| 2011/0099467 A1 | 4/2011 | Kapur et al. | |
| 2011/0131325 A1 | 6/2011 | Piccionelli et al. | |
| 2011/0209073 A1* | 8/2011 | Larson | G06F 9/44 |
| | | | 715/760 |
| 2011/0252147 A1 | 10/2011 | Ewe et al. | |
| 2011/0252160 A1 | 10/2011 | Wu | |
| 2011/0276585 A1* | 11/2011 | Wagner | H04N 21/2225 |
| | | | 707/769 |
| 2012/0072985 A1 | 3/2012 | Davne et al. | |
| 2012/0110067 A1 | 5/2012 | Birsa et al. | |
| 2012/0239785 A1* | 9/2012 | Pazos | H04L 12/1881 |
| | | | 709/219 |
| 2013/0031464 A1* | 1/2013 | Mess | G06F 17/30905 |
| | | | 715/234 |
| 2013/0074142 A1* | 3/2013 | Brennan | H04L 63/20 |
| | | | 726/1 |
| 2013/0097490 A1 | 4/2013 | Kotler et al. | |
| 2013/0159021 A1 | 6/2013 | Felsher | |
| 2013/0212484 A1 | 8/2013 | Joshi et al. | |
| 2013/0212486 A1 | 8/2013 | Joshi et al. | |
| 2013/0253904 A1 | 9/2013 | Heller et al. | |
| 2014/0351102 A1* | 11/2014 | Jolliffee | G06Q 40/12 |
| | | | 705/30 |
| 2015/0269390 A1 | 9/2015 | Schaefer et al. | |
| 2016/0050205 A1 | 2/2016 | Heller et al. | |

FOREIGN PATENT DOCUMENTS

| | | |
|---|---|---|
| EP | 3066587 A1 | 9/2016 |
| EP | 2831697 B1 | 10/2017 |
| FR | 2849561 A1 | 7/2004 |
| GB | 2535579 A | 8/2016 |
| WO | WO2002014987 A2 | 2/2002 |
| WO | WO2002023366 A1 | 3/2002 |
| WO | WO2011023664 A2 | 3/2011 |
| WO | WO2013148098 | 10/2013 |
| WO | WO2014138115 A1 | 9/2014 |
| WO | WO2015069429 A1 | 5/2015 |

OTHER PUBLICATIONS

Balakrishnan, D., et al., Adaptive context monitoring in heterogeneous environments, International Conference on Network and Service Management, 2010, pp. 422-425, [retrieved on Dec. 6, 2018], Retrieved from the Internet: <URL:http://ieeexplore.ieee.org/>.*

Non-Final Office Action, dated Jul. 25, 2014, U.S. Appl. No. 13/430,566, filed Mar. 26, 2012.

Final Office Action, dated Dec. 4, 2014, U.S. Appl. No. 13/430,566, filed Mar. 26, 2012.

Advisory Action, dated Feb. 18, 2015, U.S. Appl. No. 13/430,566, filed Mar. 26, 2012.

International Search Report dated May 20, 2013 Application No. PCT/US2013/029446.

International Search Report dated Feb. 5, 2015 Application No. PCT/US2014/060779.

Non-Final Office Action, dated Apr. 1, 2015, U.S. Appl. No. 13/430,566, filed Mar. 26, 2012.

Final Office Action, dated Aug. 26, 2015, U.S. Appl. No. 13/430,566, filed Mar. 26, 2012.

Non-Final Office Action, dated Jan. 28, 2016, U.S. Appl. No. 13/430,566, filed Mar. 26, 2012.

(56) References Cited

OTHER PUBLICATIONS

"Enterprise Software," Wikipedia, the Free Encyclopedia [online], Retrieved on Jan. 30, 2017, Retrieved from the Internet: URL:https://en.wikipedia.org/wiki/Enterprise_Software>, 1 page.
Search Report dated Jun. 9, 2016 Application No. 1519982.1, 3 pages.
Final Office Action, dated Jun. 29, 2016, U.S. Appl. No. 13/430,566, filed Mar. 26, 2012.
Extended European Search Report dated Apr. 23, 2015 Application No. 13767589.8.
Non-Final Office Action, dated Dec. 23, 2016, U.S. Appl. No. 14/539,984, filed Nov. 12, 2014.
Non-Final Office Action, dated Feb. 7, 2017, U.S. Appl. No. 13/430,566, filed Mar. 26, 2012.
"Intention to Grant," European Patent Application No. 13767589.8, dated Apr. 6, 2017, 7 pages.
Final Office Action, dated Jun. 9, 2017, U.S. Appl. No. 13/430,566, filed Mar. 26, 2012.
Final Office Action, dated Jun. 22, 2017, U.S. Appl. No. 14/539,984, filed Nov. 12, 2014.
"Extended European Search Report," European Patent Application No. 14859509.3, dated Jun. 1, 2017, 7 pages.

\* cited by examiner

DYNAMICALLY OPTIMIZED CONTENT DISPLAY

CROSS-REFERENCE TO RELATED APPLICATIONS

This nonprovisional U.S. patent application is a continuation-in-part of and claims the priority benefit of U.S. patent application Ser. No. 13/430,566 filed Mar. 26, 2012, titled "Client Specific Interactions with Enterprise Software Systems" and also claims the priority benefit of U.S. provisional patent application No. 61/901,331 filed on Nov. 7, 2013, titled "Dynamically Optimized Content Display for Mobile Devices and Security Plugins", which are hereby incorporated by reference in their entireties for all purposes.

FIELD

This application relates generally to enterprise software systems and more specifically to enterprise resource planning (ERP) systems and plugins associated with ERP systems for selective optimization and rendering of content.

BACKGROUND

ERP systems were originally developed in the 1980s and the 1990s to support access by desktop terminals and/or personal computers (PCs). These systems are quite complex, difficult to implement, and require heavy customization by customers. Oftentimes, ERP systems have specific business rules as well as regulatory and security functionalities, which are difficult to create and to reconfigure once created.

Existing ERP systems cannot provide users with optimal experience for every device; optimization of ERP systems for a specific device can require extensive customization, purchasing of additional hardware, and various system integration.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

The present disclosure is related to dynamic optimization of content. Specifically, according to one example embodiment of the present disclosure, a method for dynamic optimization of content includes receiving the content from an enterprise system and receiving parameters of a display area associated with the content. The enterprise system is pre-configured based on specific business rules. The content is analyzed to determine properties associated with the content and selectively optimized, based on the parameters of display area and the properties associated with the content, to produce optimized content. The optimized content is selectively rendered on a client device, thereby providing selective optimization and rendering of the content without reconfiguring the enterprise system.

According to another approach of the present disclosure, there is provided a system for dynamic optimization of content comprising a communication module, an analyzing module, an optimization module, and a rendering module. The communication module is operable to receive the content from an enterprise system and parameters of a display area associated with the content. The enterprise system is pre-configured based on specific business rules. The analyzing module is operable to determine properties associated with the content. The optimization module is operable to selectively optimize the content, based on the parameters of the display area and the properties associated with the content, thereby producing optimized content. The rendering module is operable to selectively render the optimized content on a client device. Thus, the selective optimization of the content is provided without reconfiguring the enterprise system

BRIEF DESCRIPTION OF THE DRAWINGS

Embodiments are illustrated by way of example and not limitation in the figures of the accompanying drawings, in which like references indicate similar elements.

DETAILED DESCRIPTION

Figure 1:
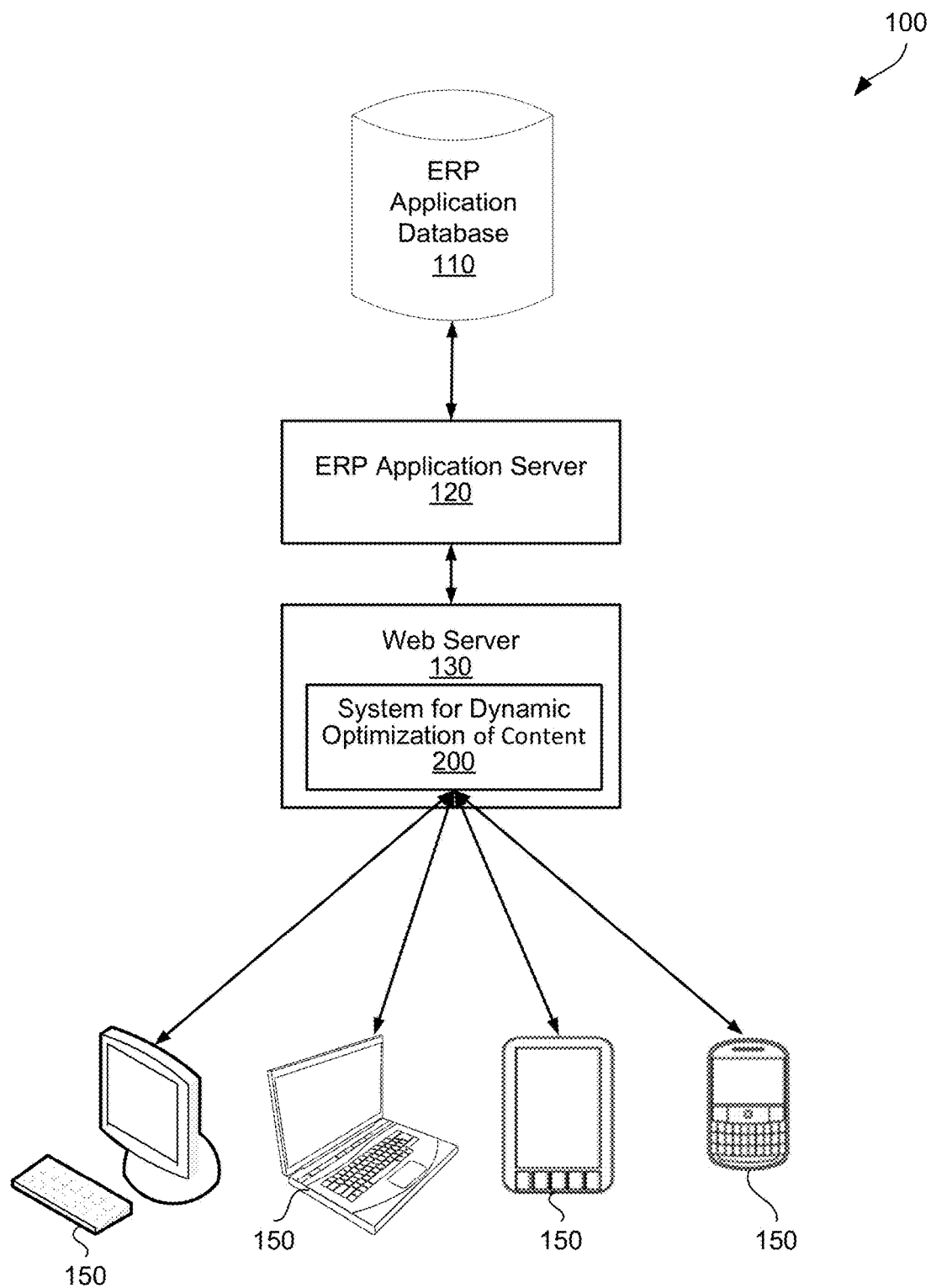
FIG. 1 is a schematic high level representation of an ERP system including a system for dynamic optimization of content on client devices.

ERP systems can integrate internal and external management information across an entire organization, embracing various relationships within the organization, such as finance/accounting, manufacturing, sales and service, and customer relationship management. ERP systems automate many of these activities with an integrated software application. The purpose of ERP systems is to facilitate the flow of information between all business functions inside the boundaries of the organization and manage the connections to outside stakeholders. ERP systems can run on a variety of computer hardware and network configurations and typically employ a database as a repository for information.

Many ERP systems are deployed as web-based applications, allowing various functions of such ERP systems to be accessed and run from remote locations via web browsers installed on tablet computers, laptops, mobile telephones, or desktop computers. However, user interfaces created for using web-applications are not optimized for specific devices. The system for dynamic optimization of content described herein enables interactions with client devices of different types without additional customizations by extending instead of replacing ERP system output. The system can perform dynamic optimization of content from an ERP system by working with the user interface generated by the ERP system. More specifically, the optimization is performed based on parameters of a display area of a client device. The parameters of the display area of the client device can be associated with user activity related to the client device. User activity can include user manipulations on the display area (e.g., by a mouse or a finger). The manipulations include, for example, changing a size of the display area by pressing and holding down the mouse button while pulling the mouse cursor to the desired end of the display area. Using this approach a user can transform the content layout according to user preferences, thereby improving the usability and user experience.

In some embodiments, the system for dynamic optimization of content enables customizations and upgrades of an ERP system. This approach allows organizations to avoid custom modifications to client devices as the system for dynamic optimization of content renders the content efficiently for any client device. In some embodiments, the system for dynamic optimization of content is a plug-in that is integrated into the web server. The system for dynamic optimization of content can leverage the output of the ERP system as the starting point for marking it up for client device access. The output is analyzed by the system to read the code/definitions of the ERP system to understand relationships between elements in the user interface, parameters of display area received from the client device, and the meaning of fields and controls on the user interface. The existing application infrastructure can be leveraged, for example, by using a J2EE web server plug-in (servlet filter) to inject the optimization logic into the processing stream. Interactions between the ERP system and client devices (requests, sessions, and requested content) can be captured by the system for dynamic optimization of content to allow rules for controlling security and content rendering.

In some embodiments, the system for dynamic optimization of content enables optimizing a user interface based on parameters of display area received from the client device. The system for dynamic optimization of content can read the content and processing done on the web server of the ERP system. Furthermore, the system can modify the content based on predetermined rules and in accordance with the parameters of the display area as received from the client device. The modifying can include restructuring the content, injecting additional content, removing at least a part of the content, and so forth. The dynamic optimization of the content is provided without reconfiguring the ERP system.

Referring now to the drawings, FIG. 1 is a schematic high level representation 100 of an ERP system comprising an ERP application database 110, an ERP application server 120, and a web server 130 with a system 200 for dynamic optimization of content for interacting with various types of client devices 150. Client devices 150 include any type of computer system capable of supporting a web browser and having some input and output means. Some examples of client devices 150 include desktops, laptops, notebooks, ultrabooks, tablet computers, handheld computers, mobile phones (e.g., smartphones), portable media players, E-book readers, game consoles, and head mounted displays. These devices may have a variety of screen sizes and input options.

Client devices 150 are connected to web server 130 using a network (not specifically shown in FIG. 1). The network can take any suitable form, such as a wide area network (WAN) or Internet and/or one or more local area networks (LANs). The network includes any suitable number and type of devices (e.g., routers and switches) for forwarding commands, content, and/or web object requests from each client to the online community application and responses back to the clients.

The systems and methods described herein can also be practiced in a wide variety of network environments including, for example, Transmission Control Protocol (TCP)/IP-based networks, telecommunications networks, wireless networks, and the like. In addition, the computer program instructions are stored in any type of computer-readable media. The program may be executed according to a variety of computing models including a client/server model, a peer-to-peer model, and a stand-alone computing device, or according to a distributed computing model in which various functionalities described herein are effected or employed at different locations.

As mentioned above, client devices 150 are capable of supporting web browsers to generate user interfaces. Web browsers allow users and administrators to access various applications and administrative tools of an ERP system. Each client device 150 used for communicating with an ERP system has browser software installed therein. Generally, no additional software (specific to the ERP system) needs to be installed on client devices 150 to implement described methods and systems.

Web server 130 includes a Java-enabled web server for supporting browser transaction requests and the application messaging technology. Web server 130 is used to install a collection of servlets (e.g., Java servlets) designed to handle a wide range of ERP transactions. Some examples of a web server include an Apache web server, Internet Information Services (IIS) web server, nginx web server, Google web server, and Resin web server. The main function of web server 130 is to deliver web pages based on requests from client devices 150. This means delivery of HTML documents and any additional content that can be included by a document, such as images, style sheets, and scripts. The web browser described above typically initiates communication by making a request for a specific resource using HyperText Transfer Protocol (HTTP), and web server 130 responds with the content of that resource or an error message if unable to do so. Web server 130 is also used to receive content from client devices 150. This feature is used for submitting web forms, including the uploading of files. Web server 130 supports server-side scripting using Active Server Pages (ASP), PHP, or other scripting languages. Additional features of web server 130 specific to ERP functions are described below.

ERP application server 120 is another part of an ERP system. ERP application server 120 executes business logic. It may also be configured to issue SQL to ERP application database 110. In other words, ERP application server 120 serves as a link between web server 130 and ERP application database 110. ERP application server 120 includes various services and server processes that handle transaction requests. ERP application server 120 is also responsible for maintaining the SQL connection to ERP application database 110 for browser requests. Two examples of middleware platforms that are used on ERP application server 120 include TUXEDO (Transactions for Unix Extended for Distributed Operations) and Jolt. For example, TUXEDO is used to manage database transactions, while Jolt is used to facilitate transaction requests issued from the Internet.

ERP application database 110, which is sometimes referred to as a database server, is yet another component of an ERP system. ERP application database 110 contains one or more database engines and databases. These, in turn, include object definitions, system tables, application tables, and data. ERP application database 110 may be running one of the supported relational database management system (RDBMS)/operating system combinations. The relationship between ERP application database 110 and ERP application server 120 may be according to a one-to-many model. That is, a single ERP application database 110 can have multiple ERP application servers 120 connecting to it. ERP application database 110 is configured to simultaneously handle multiple application server connections, development environment connections, and batch programs. A component of an ERP system that is not shown in FIG. 1 is a batch server. A batch server includes process schedulers, batch programs (e.g., application engine programs), and COBOL and SQR executables.

As stated above, a system 200 for dynamic optimization of content on web server 130 is configured to communicate with client devices 150. In certain embodiments, the system 200 for dynamic optimization of content is implemented as a web server plug-in, which is a set of software components that adds specific functionalities to a larger software application provided on web server 130. This plug-in enables customizing the functionality of web server 130.

Figure 2:
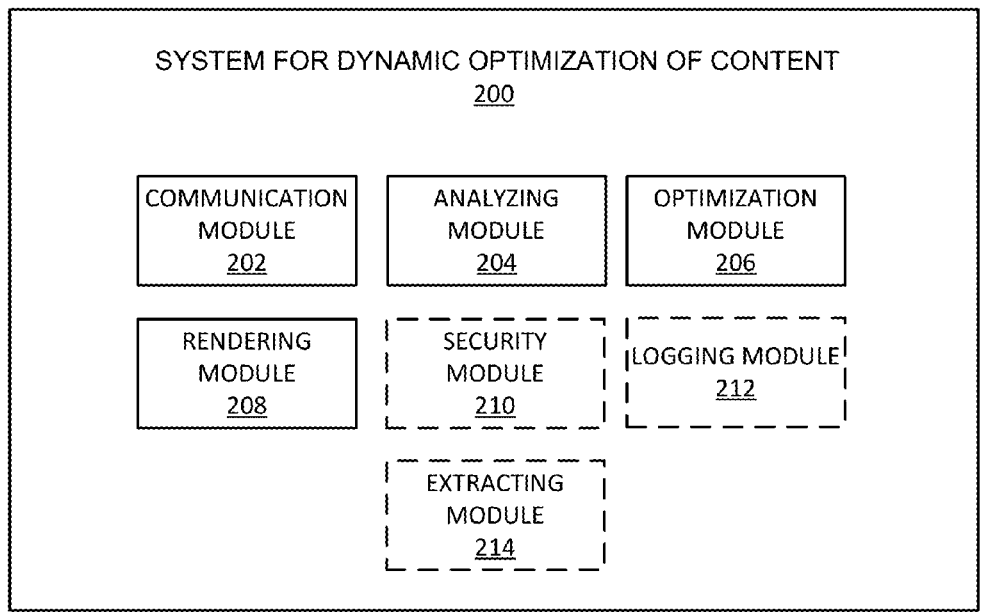
FIG. 2 is a block diagram illustrating a system for dynamic optimization of content.

To provide this functionality, system 200 for dynamic optimization of content includes multiple modules, as illustrated in FIG. 2. Specifically, system 200 for dynamic optimization of content includes communication module 202, analyzing module 204, optimization module 206, and rendering module 208, and, optionally, security module 210, logging module 212, and extracting module 214.

In an example embodiment, communication module 202 is operable to receive the content from an ERP system. The ERP system is pre-configured based on specific business rules. Communication module 202 is further operable to receive parameters of a display area associated with the content. The parameters of the display area include one or more of the following: width of the display area, height of the display area, arrangement of the content on the display area, elements to be included into the content, elements to be excluded from the content, and so forth. The parameters of the display area are associated with user activity related to the client device. User activity can include user manipulations on the display area (e.g., by a mouse). Manipulation includes, for example, changing a size of the display area by pressing and holding down the mouse button while pulling the mouse cursor to the desired end of the display area.

In an example embodiment, analyzing module 204 is operable to determine properties associated with the content. The properties associated with the content include definition and structure of the enterprise system.

In an example embodiment, optimization module 206 is operable to selectively optimize the content. The content is optimized based on the parameters of the display area and the properties associated with the content. The content can be further optimized based on configuration of the client device. In such a case, the system 200 for dynamic optimization of content comprises extracting module 214. Extracting module 214 is operable to read and cache configuration of the client device on a web server of the enterprise system.

The optimization module 206 is integrated into a web server of the ERP system. As a result of optimization, optimized content is produced. Optimization of the content can include one or more of the following: restructuring the content, injecting additional content, removing at least a part of the content, and the like.

In an example embodiment, rendering module 208 is operable to selectively render the optimized content on a client device. The client device includes one or more of a desktop, a laptop, a notebook, an ultrabook, a smartphone, a tablet computer, and so forth. As a result, the selective optimization of the content is provided without reconfiguring the ERP system.

In a further example embodiment, security module 210 is operable to provide security. The security is based on one or more of the following: a location, a network, rules-based authentication, multiple-factor authentication, time-based authentication, a proxy associated with routing of the content, application data, screens associated with the content, functionality associated with the content, and so forth.

In another example embodiment, logging module 212 is operable to log information related to one or more of the following: an identity of a user and actions performed under the user in the enterprise system, an identity of the data accessed, a source of a location associated with the client device, and so forth.

In some embodiments, in order to ensure optimization of the content based on configuration of the client device, the functionality of the system 200 for dynamic optimization of content is represented by an admin services component, a navigation component, a user interface component, a client device extensions component, a security component, and a metadata services component.

The admin services component controls the overall processing of the system for dynamic optimization of content. Because it is intended to function as a seamless part of the ERP application infrastructure, it is designed to work in conjunction with the processing already done on the web server of the ERP system. As such, it makes decisions about displaying client device rendering, allowing access to content, level of logging performed, type of content to be served, and/or necessity to reload access rules from the database. In order to make these decisions, the system for dynamic optimization of content understands a profile of the user/device accessing the system, state of the plug-in, and type of request being made to the system.

The admin services component uses the following attributes of the user/device to control access to the system: the browser/operating system making the request to the system (used to determine whether a client device is accessing the system and make a decision as to whether to perform rendering) and the location from which the user is accessing the system (this is used to determine whether to grant or deny access to content based on location).

In some embodiments, the type of content requested from the system is used to control the request processing. If the request is for HTML content for the system, the HTML generated by the application will be used as the starting point for rendering. If the request is for navigation menus, then the plug-in will request the raw menu information from the system and generate its own rendering. If the request is for portal content, then the plug-in will either start with the HTML generated by the application or request the raw data, depending on whether the request is related to navigation or content.

In some embodiments, the navigation component reads navigation rules of the ERP system and repurposes content for client device access. Services performed by the navigation component include reading the hierarchy of menu titles and descriptions to be presented in a format of the client device as users drill through the menus; pruning navigation to parts of the system that are disabled either due to location security or device access rules; and keeping track of the breadcrumbs and maintaining a breadcrumb menu to allow easy access without hitting the back button. The latter includes navigating through menu relationships in the navigation definitions of the application; identifying navigation collections (pages defined for the purpose of navigation) and displaying them in a menu form; and identifying when the system was accessed from an external system and embedding the breadcrumb for it in the breadcrumb menu. To perform these services, the infrastructure of the navigation component includes JQuery menu and navigation components; role-based caching of navigation menus to minimize the need to request information from the ERP system about who can access what content; and metadata services to allow the web server to access the menus, rules, and the like that drive the presentation and navigation within the system.

In some embodiments, the user interface component takes the user interface generated by the ERP application and modifies it to work properly on client devices. This includes marking up the HTML generated by the ERP system. Marking up the HTML involves several operations. The first operation is marking the HTML as valid HTML5 syntax. Then, it involves identifying the meaning of the content on the generated user interface by looking at the HTML and Asynchronous Javascript And XML (AJAX XML) generated by the application. The metadata services component is used in combination with the structure of the user interface (UI) to decide on an association of page elements, such as page containers (group boxes), labels, fields, and page controls; movement of groups of entities within the user interface, so that pages can be displayed in narrow mode and still be meaningful; tagging of fields as to the type of field (i.e., numeric, date, time, alphanumeric); honoring of multilingual translations within the ERP system; changing controls to touch-optimized controls using JQuery (or similar library); and removing extraneous HTML markup (such as extra tables and width tags) intended to optimize UI for wide screen monitors.

Another operation that is a part of marking up the HTML is managing JavaScript generated by the ERP system. This consists of stripping out extraneous JavaScript not needed on the client device and embedding JavaScript to perform processing on the device to minimize the number of server trips and improve performance (such as navigating between multiple items within a page).

Also, marking up the HTML includes rules-based templating infrastructure to minimize code serving to process UI services, thereby allowing rapid iterations and deployments without requiring re-compilation of code; and deciding on logic for making modifications to user interface without requiring expensive processing to walk the document object model (DOM) for each page being rendered.

In some embodiments, the client device extensions component provides a capability for injecting customer-defined logic to the end-product of the user interface component. This allows the customer to make additional UI tweaks to the ERP system without requiring modification of either the core ERP application or the core code of the plug-in. The UI tweaks include injecting modifications without changing the plug-in at different locations within the generated UI. This is done based on understanding properties of the session/user/ and content in the ERP system, leveraging the same rules-based templating infrastructure in the UI services to allow robust processing rules based on content, user, session, or application data; and allowing calls to any JavaScript library that is enabled in the system. The modifications are defined and administered in relational database pages that are deployed within the user interface of the ERP system.

In some embodiments, the security component provides device and location security features to allow easy control, management, and auditing of access to a client device. This includes rules-based means of identifying whether to allow or block access to parts of the ERP system; generating detailed logs of all traffic, including date/time, IP address, user identity, content accessed, data accessed, and actions taken; and automatic pruning of navigation UI based on rules.

In some embodiments, the metadata services component represents the bridge between the product processing on the server and the rules by which it performs this processing. The metadata services component provides services that extract rules that define how the ERP system is defined and structured, and services that extract rules that drive how the plug-in should operate on top of the ERP system. By understanding the meaning of the different parts of the ERP system to be rendered, the plug-in is able to automatically transform the UI of the ERP application. For all of these services, the metadata services component reads the definitions from relational tables and application programming interfaces (APIs) in the ERP system; stores the definitions in a cache on the web server to be processed locally; and manages the reading and storing of the definitions at either web server start-up time or as content is requested.

The metadata services component extracts the meaning of all of the pieces of the user interface generated by the ERP system. Because the plug-in understands at a granular level the meaning of all pieces of the ERP system, whether developed by the original software developer or modified by the customer, it is able to automate the optimized rendering of the user interface. The types of metadata read from the ERP system to be used as part of the plug-in include page element structure, element properties, control properties, navigation rules, and user identity and permissions.

As the metadata services component is configured and administered from pages within the ERP system delivered by the plug-in, it also includes services to read and cache the client device configuration on the web server (i.e., branding rules, client device extensions, additional CSS and JavaScript rules).

In some embodiments, because the plug-in contains location-based security capabilities, the rules that define the access control and logging are also managed as part of the metadata services.

Figure 3:
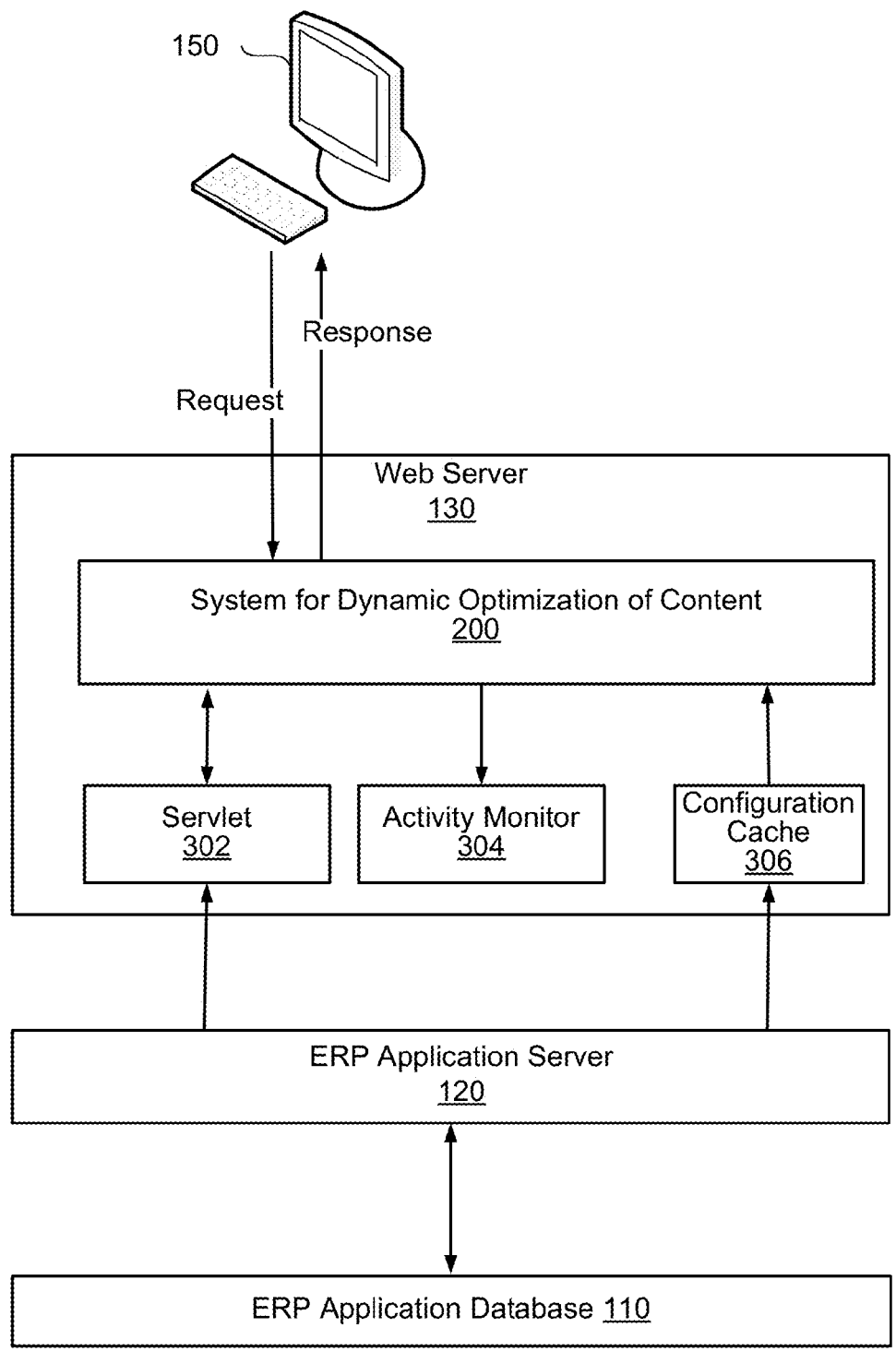
FIG. 3 is a schematic representation of various interactions between components of the ERP system and a client device.

FIG. 3 is a schematic representation of various interactions between components of an ERP system, a system 200 for dynamic optimization of content, and a client device 150. Client device 150 is equipped with a web browser, which uses HTTP protocol. The browser sends requests to web server 130, which forwards the request to ERP application server 120 and further to ERP application database 110. Servlet 302 installed on web server 130 facilitates all browser connections. Configuration data is transferred to configuration cache 306 and further to the system 200 for dynamic optimization of content. User and device data and activity tracking is transferred to activity monitor 304.

Figure 4:
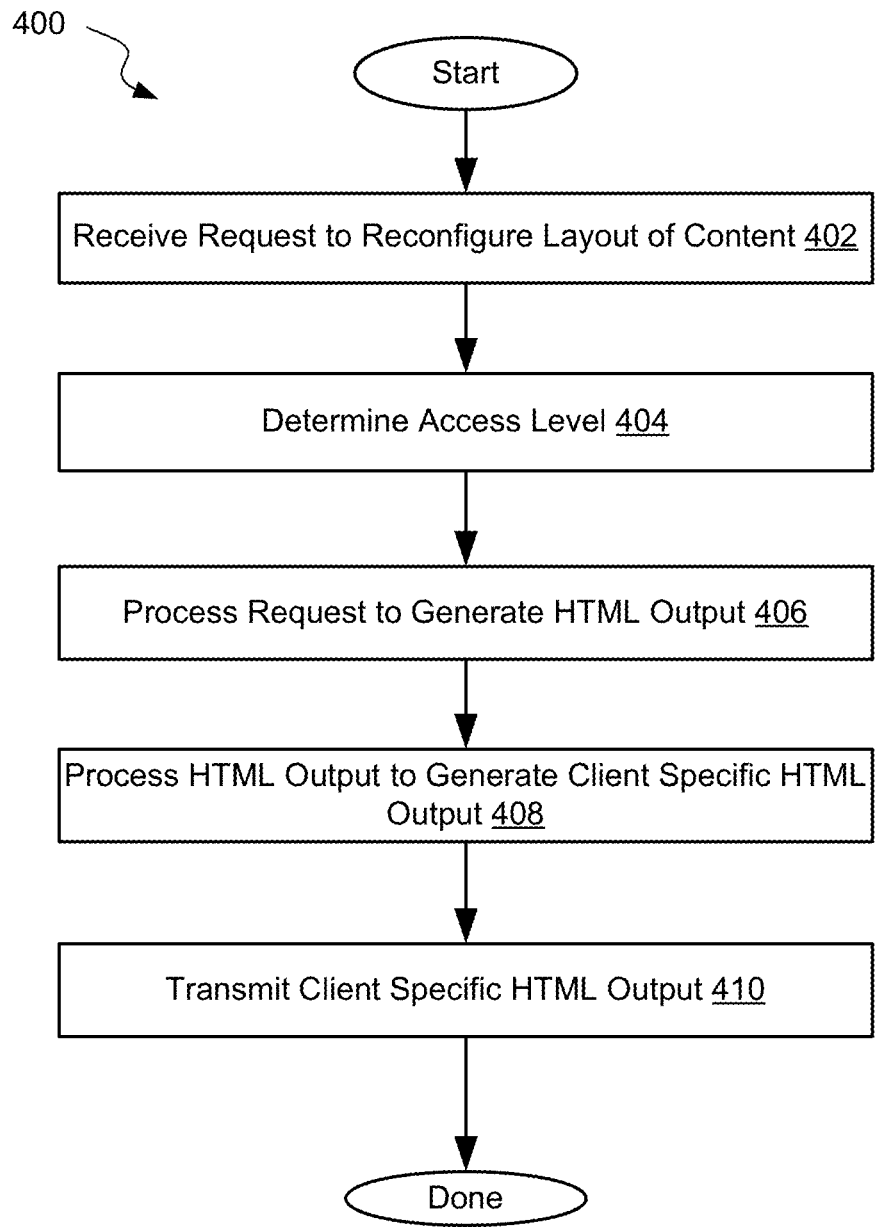
FIG. 4 is a flow diagram illustrating various interactions between components of the ERP system, a system for dynamic optimization of content, and a client device.

FIG. 4 is a process flow chart representing the handling of a client request by an ERP system with a system for dynamic optimization of content. Method 400 commences with receiving a request from a client device at a web server including a system for dynamic optimization of content during operation 402. The request includes parameters of a display area associated with the content to be represented on the client device.

Based on the received request or previously received information, an access level available for this type of client device is determined during operation 404. The previously received information includes another request, login information, and/or a cookie. For example, the request is generated either by a non-mobile computer system or a mobile computer system. Depending on the type of computer system, different access levels are given to the device, and the same type of request may be processed in different manners. Method 400 then proceeds with processing the request at an application server of the ERP system based on the access level during operation 406. This processing operation generates an HTML output. The HTML output involves retrieval of ERP information from an application database of the ERP system.

Method 400 proceeds with processing the HTML output at the ERP interface based on the received parameters of the display area associated with the content to generate a client specific HTML output during operation 408, and transmitting the client specific HTML output to the client device during operation 410.

Figure 5:
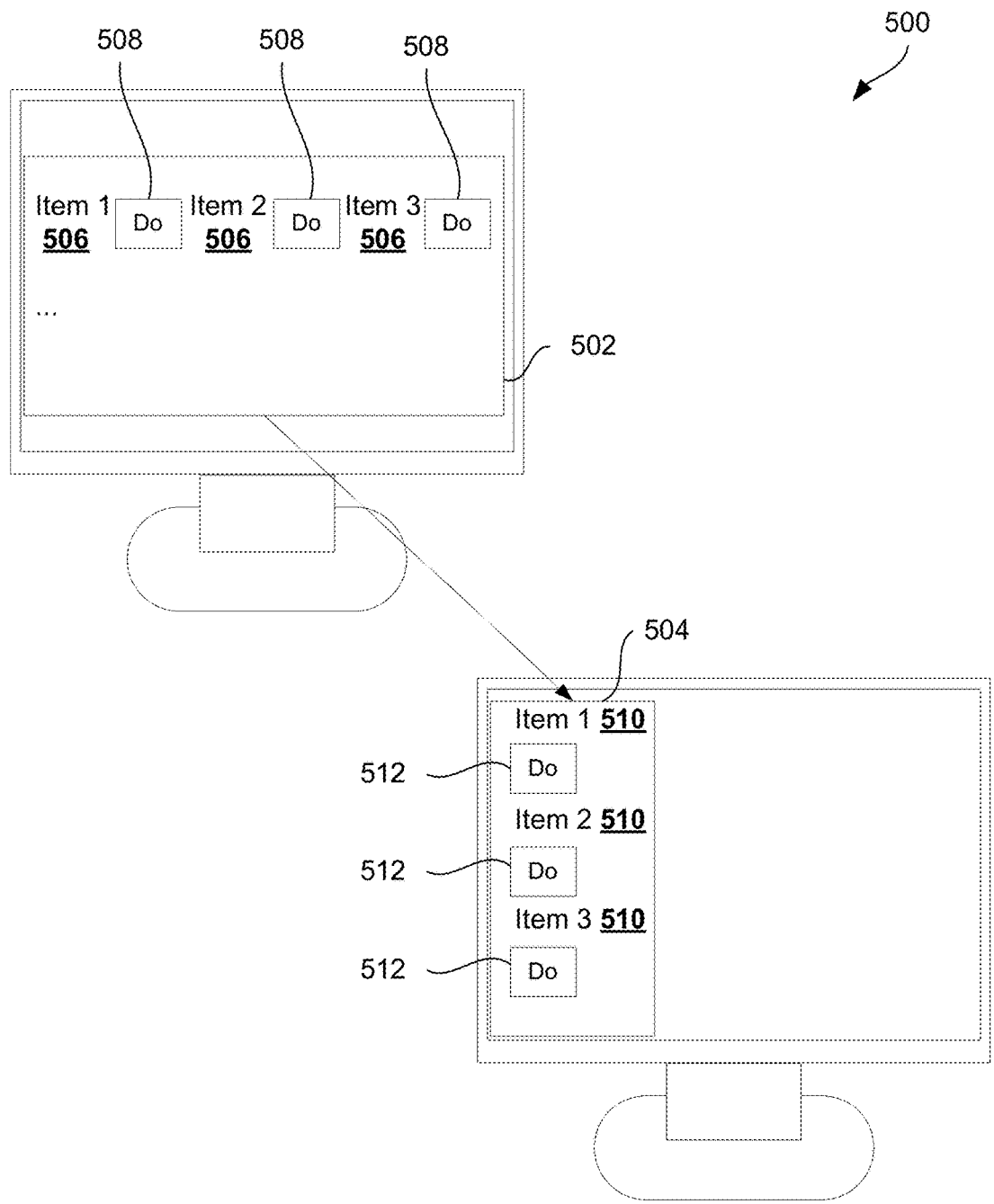
FIG. 5 is a block diagram showing handling of a client request by the ERP system with a system for dynamic optimization of content.

FIG. 5 is a schematic representation 500 showing exemplary optimization of content for a client device. Interface items 506 and corresponding controls 508 rendered on a display area 502 may be optimized to produce a display area 504 with optimized arrangement of interface items 510 and corresponding controls 512. The optimization can be performed based on received parameters of the display area 504.

Figure 6:
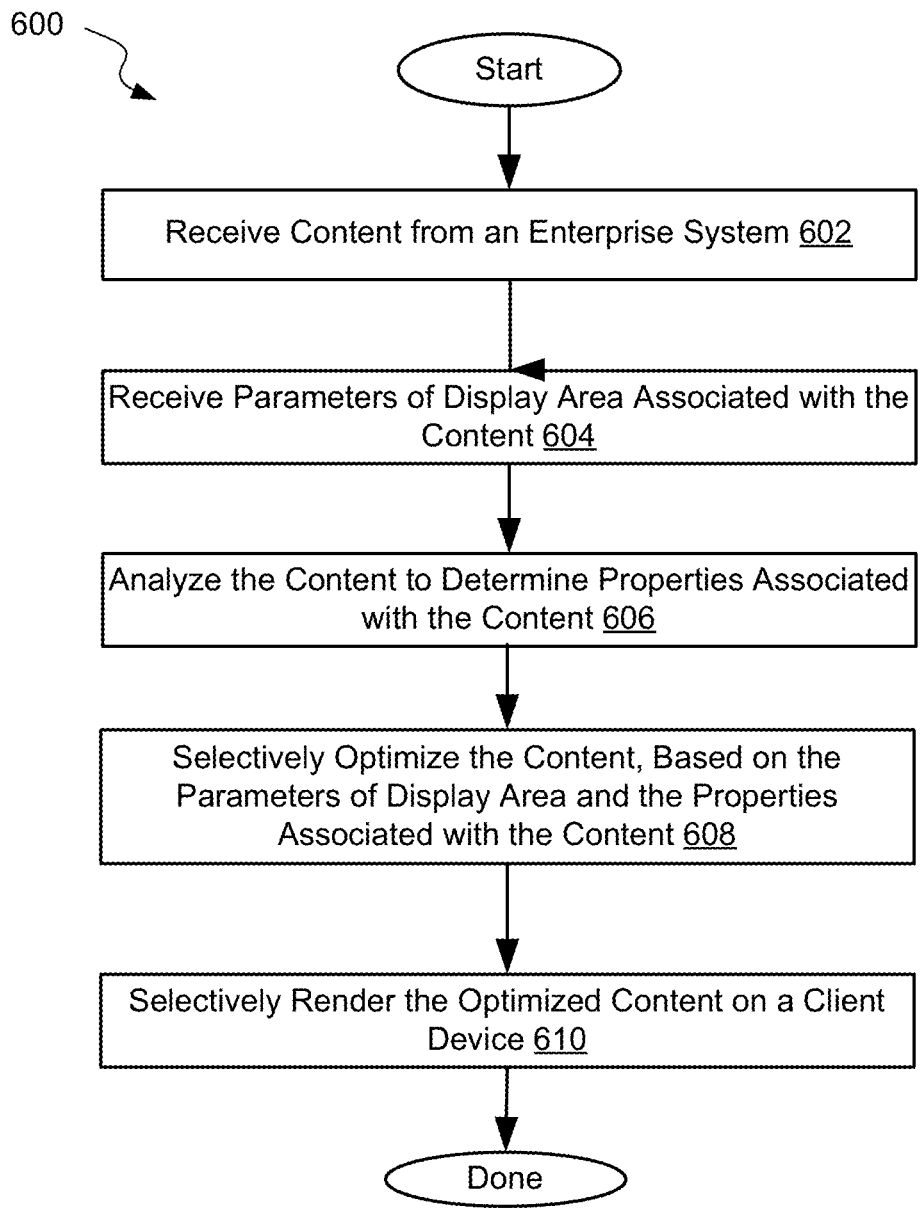
FIG. 6 is a process flow chart representing a method for dynamic optimization of content.

FIG. 6 is a process flow chart showing a detailed method for dynamic optimization of content. The method 600 is performed by processing logic that comprises hardware (e.g., dedicated logic, programmable logic, microcode, etc.), software (such as that which is run on a general-purpose computer system or a dedicated machine), or a combination of both. In one exemplary embodiment, the processing logic resides at the system 200 illustrated in FIG. 2.

The method 600 commences at operation 602 with the communication module receiving the content from an ERP system. The ERP system is pre-configured based on specific business rules.

Parameters of a display area associated with the content are received at operation 604. The parameters of the display area include one or more of the following: width of the display area, height of the display area, arrangement of the content on the display area, elements to be included into the content, elements to be excluded from the content, and so forth.

At operation 606, the content is analyzed to determine properties associated with the content. The properties associated with the content include definition and structure of the enterprise system.

After receiving the parameters of the display area and determining properties associated with the content, the content is selectively optimized at operation 608. As a result, optimized content is produced. The optimization is based on the parameters of the display area and the properties associated with the content. The optimization of the content includes one or more of the following: restructuring the content, injecting additional content, removing at least a part of the content, and the like.

In an example embodiment, the optimization of the content is further based on configuration of a client device. The client device includes one or more of a desktop, a laptop, a notebook, an ultrabook, a smartphone, a tablet computer, and so forth. In such a case, configuration of the client device is read and cached on a web server of the ERP system.

Thereafter, the optimized content is selectively rendered on the client device at operation 610. Thus, selective optimization of the content is provided without reconfiguring the ERP system.

In an example embodiment, method 600 optionally comprises providing security. The security is based on one or more of the following: a location, a network, rules-based authentication, multiple-factor authentication, time-based authentication, a proxy associated with routing of the content, application data, screens associated with the content, functionality associated with the content, and so forth.

In a further example embodiment, method 600 optionally comprises logging information related to one or more of the following: an identity of a user and actions performed under the user in the enterprise system, an identity of the data accessed, a source of a location associated with the client device, and the like.

Figure 7:
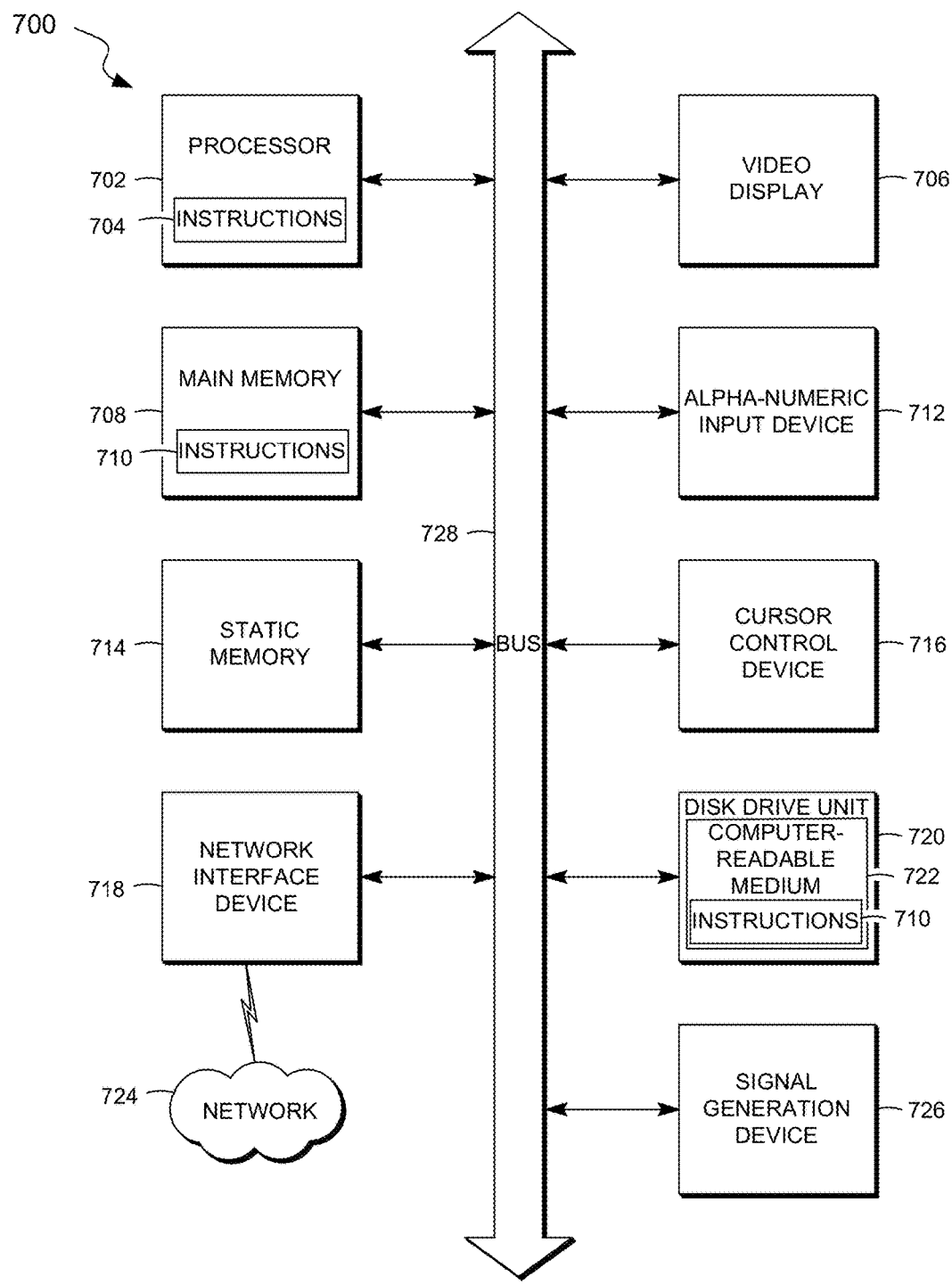
FIG. 7 is a diagrammatic representation of an exemplary machine in the form of a computer system, within which a set of instructions for causing the machine to perform any one or more of the methodologies discussed herein may be executed.

FIG. 7 is a diagrammatic representation of an exemplary machine in the form of a computer system 700, within which a set of instructions for causing the machine to perform any one or more of the methodologies discussed herein may be executed. In various exemplary embodiments, the machine operates as a standalone device or are connected (e.g., networked) to other machines. In a networked deployment, the machine operates in the capacity of a server or a client machine in a server-client network environment, or as a peer machine in a peer-to-peer (or distributed) network environment. The machine includes a PC, a tablet PC, a set-top box (STB), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 700 includes a processor or multiple processors 702 (e.g., a central processing unit (CPU), a graphics processing unit (GPU), or both), and a main memory 708 and static memory 714, which communicate with each other via a bus 728. The computer system 700 further includes a video display 706 (e.g., a liquid crystal display (LCD)). The computer system 700 also includes an alphanumeric input device 712 (e.g., a keyboard), a cursor control device 716 (e.g., a mouse), a voice recognition or biometric verification unit (not shown), a disk drive unit 720, a signal generation device 726 (e.g., a speaker) and a network interface device 718. The computer system 700 further includes a data encryption module (not shown) to encrypt data.

The disk drive unit 720 includes a computer-readable medium 722 on which is stored one or more sets of instructions and data structures (e.g., instructions 710) embodying or utilizing any one or more of the methodologies or functions described herein. The instructions 710 also reside, completely or at least partially, within the main memory 708 and/or within the processors 702 during execution thereof by the computer system 700. The main memory 708 and the processors 702 also constitute machine-readable media.

The instructions 710 are further transmitted or received over a network 724 via the network interface device 718 utilizing any one of a number of well-known transfer protocols (e.g., HTTP).

While the computer-readable medium 722 is shown in an exemplary embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media also include, without limitation, hard disks, floppy disks, flash memory cards, digital video disks, random access memory (RAM), read only memory (ROM), and the like.

The exemplary embodiments described herein may be implemented in an operating environment comprising software installed on a computer, in hardware, or in a combination of software and hardware.

Thus, methods and systems for dynamic optimization of content have been disclosed. Although embodiments have been described with reference to specific exemplary embodiments, it will be evident that various modifications and changes may be made to these embodiments without departing from the broader spirit and scope of the system and method described herein. Accordingly, the specification and drawings are to be regarded in an illustrative rather than a restrictive sense.

What is claimed is:

1. A system for dynamic optimization of content generated by an enterprise system comprising:
    a processor;
    a memory coupled to the processor;
    a communication module, stored in the memory, operable to:
        receive the content generated by the enterprise system, the enterprise system being pre-configured based on predetermined business rules, wherein the enterprise system is managing activities across an organization, the activities including at least one of finance, manufacturing, sales and service, and customer relationship management, the predetermined business rules being provided at least for automating the activities;
        receive parameters of a display area associated with the content from a client device, the parameters of the display area comprising an arrangement of the content on the display area;
        determine an access level available to the client device to access the content based on a physical location of the client device and based on an identity of a user associated with the client device; and
        determine, based on the access level, accessible content and blocked content for the client device;
    an analyzing module, stored in the memory, operable to:
        determine properties associated with the accessible content, the determining comprising reading metadata from the enterprise system, the metadata comprising page element structure, element properties, control properties, navigation rules, and the identity of the user and permissions;
    an optimization module, stored in the memory, operable to selectively optimize the accessible content, based on the parameters of the display area and the properties associated with the accessible content, thereby producing optimized content, wherein the optimization module is configured to:
        use a HyperText Markup Language (HTML) generated by the enterprise system as a starting point for rendering if HTML content is received; and
        generate a rendering for a navigation menu, the generating of the rendering including:
            requesting raw menu information from the enterprise system to determine the navigation rules;
            repurposing the navigation menu for access of the navigation menu by the client device;
            determining, based on the identity of the user and the physical location of the client device, portions of the navigation menu directed to the blocked content, wherein the identity of the user is determined based on login information provided by the user via the client device to the enterprise system, the login information being associated with a profile of the user in the enterprise system, the profile of the user being associated with the permissions set in the enterprise system for the user to access portions of the content generated by the enterprise system, wherein the portions of the navigation menu directed to the blocked content are determined at least based on the permissions set for the user and the physical location of the client device; and
            removing the portions of the navigation menu directed to the blocked content for the client device; and
    a rendering module, stored in the memory, operable to selectively render the optimized content on the client device, thereby providing for selective optimization of the accessible content without reconfiguring the enterprise system.

2. The system of claim 1, wherein the parameters of the display area include one or more of the following: a width of the display area, a height of the display area, an element to be included into the content, and an element to be excluded from the content.

3. The system of claim 1, wherein the client device includes one or more of a desktop, a laptop, a notebook, an ultrabook, a smartphone, and a tablet computer.

4. The system of claim 1, further comprising a security module, stored in the memory, operable to provide security, wherein the security is based on one or more of the following: a location, a network, rules-based authentication, multiple-factor authentication, time-based authentication, a proxy associated with routing of the content, application data, screens associated with the content, and functionality associated with the content.

5. The system of claim 1, further comprising a logging module, stored in the memory, operable to log information related to one or more of the following: an identity of a user and actions performed under the user in the enterprise system, an identity of data accessed, and a source of a location associated with the client device.

6. The system of claim 1, wherein the optimizing of the accessible content includes one or more of the following: restructuring the accessible content, injecting additional content, and removing at least a part of the accessible content.

7. The system of claim 1, wherein the parameters of the display area are associated with user activity related to the client device.

8. The system of claim 1, wherein the optimizing of the accessible content is further based on configuration of the client device.

9. The system of claim 1, further comprising an extracting module, stored in the memory, operable to read and cache a configuration of the client device on a web server of the enterprise system.

10. The system of claim 1, wherein the communication module is further operable to receive content from at least one client device comprising content submitted by a user from a web form and content uploaded from at least one file by the user.

11. A method for dynamic optimization of content generated by an enterprise system, the method comprising:
  receiving the content generated by the enterprise system, the enterprise system being pre-configured based on predetermined business rules, wherein the enterprise system is managing activities across an organization, the activities including at least one of finance, manufacturing, sales and service, and customer relationship management, the predetermined business rules being provided at least for automating the activities;
  receiving parameters of a display area associated with the content from a client device, the parameters of the display area comprising an arrangement of the content on the display area;
  determining an access level available to the client device to access the content based on a physical location of the client device and based on an identity of a user associated with the client device;
  determining, based on the access level, accessible content and blocked content for the client device;
  analyzing the accessible content to determine properties associated with the accessible content, the determining comprising reading metadata from the enterprise system, the metadata comprising page element structure, element properties, control properties, navigation rules, and the identity of the user and permissions;
  selectively optimizing the accessible content, based on the parameters of the display area and the properties associated with the accessible content, thereby producing optimized content, wherein the optimizing comprises:
    using a HyperText Markup Language (HTML) generated by the enterprise system as a starting point for rendering if HTML content is received; and
    generating a rendering for a navigation menu, the generating of the rendering including:
      requesting raw menu information from the enterprise system to determine the navigation rules;
      repurposing the navigation menu for access of the navigation menu by the client device;
      determining, based on the identity of the user and the physical location of the client device, portions of the navigation menu directed to the blocked content, wherein the identity of the user is determined based on login information provided by the user via the client device to the enterprise system, the login information being associated with a profile of the user in the enterprise system, the profile of the user being associated with the permissions set in the enterprise system for the user to access portions of the content generated by the enterprise system, wherein the portions of the navigation menu directed to the blocked content are determined at least based on the permissions set for the user and the physical location of the client device; and
      removing the portions of the navigation menu directed to the blocked content for the client device; and
  selectively rendering the optimized content on the client device, thereby providing for selective optimization of the accessible content without reconfiguring the enterprise system.

12. The method of claim 11, wherein the parameters of the display area include one or more of the following: a width of the display area, a height of the display area, an element to be included into the content, and an element to be excluded from the content.

13. The method of claim 11, wherein the client device includes one or more of a desktop, a laptop, a notebook, an ultrabook, a smartphone, and a tablet computer.

14. The method of claim 11, further comprising providing security, wherein the security is based on one or more of the following: a location, a network, rules-based authentication, multiple-factor authentication, time-based authentication, a proxy associated with routing of the content, application data, screens associated with the content, and functionality associated with the content.

15. The method of claim 11, wherein the optimizing of the accessible content includes one or more of the following: restructuring the accessible content, injecting additional content, and removing at least a part of the accessible content.

16. The method of claim 11, further comprising logging information related to one or more of the following: an identity of a user and actions performed under the user in the enterprise system, an identity of data accessed, and a source of a location associated with the client device.

17. The method of claim 11, further comprising reading and caching a configuration of the client device on a web server.

18. The method of claim 11, wherein the optimizing further comprises removing portions of the navigation menu that are disabled due to the physical location of the client device or device access rules.

19. A non-transitory processor-readable medium having instructions stored thereon, which when executed by one or more processors of a web server, cause the one or more processors to implement a method for dynamic optimization of content generated by an enterprise system, the method comprising:
  receiving the content generated by the enterprise system, the enterprise system being pre-configured based on predetermined business rules, wherein the enterprise system is managing activities across an organization, the activities including at least one of finance, manufacturing, sales and service, and customer relationship management, the predetermined business rules being provided at least for automating the activities;
  receiving parameters of a display area associated with the content from a client device, the parameters of the display area comprising an arrangement of the content on the display area;
  determining an access level available to the client device to access the content based on a physical location of the client device and based on an identity of a user associated with the client device;
  determining, based on the access level, accessible content and blocked content for the client device;
  analyzing the accessible content to determine properties associated with the accessible content, the determining comprising reading metadata from the enterprise system, the metadata comprising page element structure, element properties, control properties, navigation rules, and the identity of the user and permissions;
  selectively optimizing the accessible content, based on the parameters of the display area and the properties associated with the accessible content, thereby producing optimized content, wherein the optimizing comprises:
    using a HyperText Markup Language (HTML) generated by the enterprise system as a starting point for rendering if HTML content is received; and generating a rendering for a navigation menu, the generating of the rendering including:
   requesting raw menu information from the enterprise system to determine the navigation rules;
   repurposing the navigation menu for access of the navigation menu by the client device;
   determining, based on the identity of the user and the physical location of the client device, portions of the navigation menu directed to the blocked content, wherein the identity of the user is determined based on login information provided by the user via the client device to the enterprise system, the login information being associated with a profile of the user in the enterprise system, the profile of the user being associated with the permissions set in the enterprise system for the user to access portions of the content generated by the enterprise system, wherein the portions of the navigation menu directed to the blocked content are determined at least based on the permissions set for the user and the physical location of the client device; and
   removing the portions of the navigation menu directed to the blocked content for the client device; and
selectively rendering the optimized content on the client device, thereby providing for selective optimization of the accessible content without reconfiguring the enterprise system.

* * * * *